(12) United States Patent
Naito (10) Patent No.: US 11,977,948 B2
(45) Date of Patent: May 7, 2024

(54) CODE READING DEVICE AND CODE READING METHOD

(71) Applicant: TOSHIBA TEC KABUSHIKI KAISHA, Tokyo (JP)

(72) Inventor: Hidehiro Naito, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 17/830,384

(22) Filed: Jun. 2, 2022

(65) Prior Publication Data

US 2023/0070189 A1 Mar. 9, 2023

(30) Foreign Application Priority Data

Sep. 3, 2021 (JP) ................. 2021-143678

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
CPC ................... G06K 7/10861; G06K 7/10722
USPC ...................................... 235/462.41
See application file for complete search history.

(56) References Cited

U.S. PATENT DOCUMENTS

2007/0102520 A1* 5/2007 Carlson .............. H04N 25/42
348/E3.02
2014/0177912 A1 6/2014 Okamura \* cited by examiner

*Primary Examiner* — Toan C Ly
(74) *Attorney, Agent, or Firm* — Amin, Turocy & Watson, LLP (57) ABSTRACT

According to one embodiment, a code reading device includes: a camera including an image sensor with a plurality of image pickup elements, the camera being configured to pick up an image of a symbol attached to merchandise; a decision unit configured to decide a position of clipping in the image sensor, based on change information for changing a set position of clipping in the image sensor, when the change information is inputted; and an image processing unit configured to perform image processing on the symbol, based on an image by the image sensor corresponding to the decided position of clipping.

17 Claims, 10 Drawing Sheets

CODE READING DEVICE AND CODE READING METHOD

CROSS-REFERENCE TO RELATED APPLICATION

This application is based upon and claims the benefit of priority from Japanese Patent Application No. 2021-143678, filed on Sep. 3, 2021, the entire contents of which are incorporated herein by reference.

FIELD

Embodiments described herein relate generally to a code reading device and a code reading method.

BACKGROUND

According to the related art, for example, in a store that sells merchandise, a symbol such as a barcode or a two-dimensional code is printed on the merchandise or a label with such a symbol printed thereon is attached to the merchandise. A code reading device picks up an image of the symbol attached to the merchandise by a camera, performs image processing on (decodes) the picked-up image, and thus reads information about the merchandise. The camera has an image sensor. The image sensor is a semiconductor sensor having a large number of image pickup elements and receives light entering from the lens of the camera. The code reading device performs image processing on the light received by the image sensor and thus converts the light into an electrical signal.

Recently, due to the emergence of an image sensor of a high-image-quality model having a greater number of image pickup elements (that is, a greater "number of pixels") per predetermined area, image processing may take a longer time. Therefore, processing of clipping (or cutting out) a part of the image pickup elements and performing image processing for the clipped image pickup elements is employed, instead of using all the image pickup elements of the image sensor. Clipping a part of the image pickup elements results in a reduction in the time taken for image processing.

Incidentally, a merchandise registration device with a code reading device incorporated therein is used either for a rightward passage, where customers move from left to right, or for a leftward passage, where customers move from right to left, depending on the layout or the like in the store. The direction in which merchandise is moved for the code reading device to read the symbol is reversed between the rightward passage and the leftward passage. In order to increase the efficiency of scanning (or the efficiency of reading) by the code reading device in the clipped state, it is desirable that a read area where the symbol can be read is located upstream in the direction of flow of merchandise so as to start reading the symbol early. However, the clipping position in the image sensor is fixed at the center and therefore the read area cannot be moved. Thus, the efficiency of scanning by the code reading device in the clipped state is not high.

DETAILED DESCRIPTION

An embodiment described herein is to provide a code reading device and a code reading method in which the efficiency of scanning in the clipped state can be increased.

In general, according to one embodiment, a code reading device includes: a camera including an image sensor with a plurality of image pickup elements, the camera being configured to pick up an image of a symbol attached to merchandise; a decision unit configured to decide a position of clipping in the image sensor, based on change information for changing a set position of clipping in the image sensor, when the change information is inputted; and an image processing unit configured to perform image processing on the symbol, based on an image by the image sensor corresponding to the decided position of clipping.

An embodiment will now be described with reference to the drawings. In the embodiment, a POS terminal is described as an example of a merchandise sales data processing device. The embodiment is one embodiment of the code reading device and the code reading method. The configurations, functions, and the like in the embodiment are not intended to limit the present disclosure.

Figure 1:
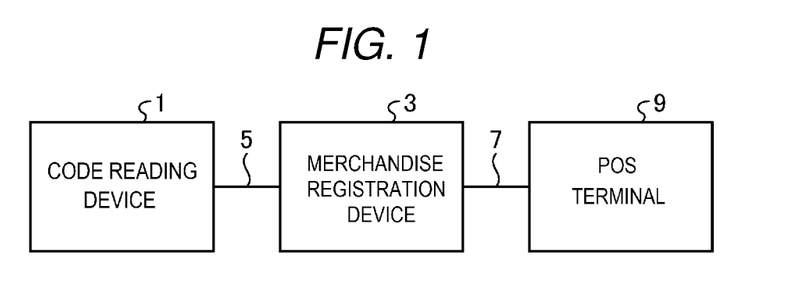
FIG. 1 shows the connecting relationship between a code reading device, a merchandise registration device, and a POS terminal according to an embodiment.

FIG. 1 shows the connecting relationship between a code reading device, a merchandise registration device, and a POS terminal according to the embodiment. As shown in FIG. 1, a code reading device 1 is connected to a merchandise registration device 3 via a connection line 5. The code reading device 1 is incorporated in and attached to the casing of the merchandise registration device 3. The merchandise registration device 3 is connected to a POS terminal 9 via a communication line 7.

The code reading device 1 is a device that reads a symbol (for example, a barcode or a two-dimensional code) attached to merchandise. The code reading device 1 has a camera 19 shown in FIG. 9. The camera 19 has an image sensor 191 inside. The image sensor 191 is a semiconductor sensor having a large number of image pickup elements in a planar form. The image sensor 191 receives light entering from the lens of the camera 19. This is referred to as "image pickup". When merchandise passes in front of the code reading device 1, the image sensor 191 receives light including an image of a symbol attached to the merchandise. The code reading device 1 converts the light received by the image sensor 191 into an electrical signal. The processing of converting the light received by the image sensor 191 into an electrical signal is referred to as image processing or decoding. The code reading device 1 transmits code information of the merchandise on which image processing was performed, to the merchandise registration device 3 via the connection line 5.

The merchandise registration device 3 acquires a merchandise code that specifies the merchandise, based on the information about the merchandise received from the code reading device 1, and executes merchandise registration processing for this merchandise. The merchandise registration processing includes processing of accessing and displaying merchandise information such as the merchandise name and price of the merchandise, based on the acquired merchandise code, and storing the merchandise information in a merchandise information unit 331 shown in FIG. 10. The merchandise registration device 3 transmits the merchandise information for which merchandise registration processing was performed, to the POS terminal 9.

The POS terminal 9 executes settlement processing corresponding to the transaction, based on the merchandise information received from the merchandise registration device 3. The settlement processing refers to processing of displaying the total amount and the amount of change (hereinafter referred to as "settlement information") corresponding to the transaction with the customer, based on the merchandise information about the merchandise for which merchandise registration processing was performed. The settlement processing includes processing of dispensing a receipt on which the merchandise information and the settlement information about the settled merchandise are printed.

Figure 2:
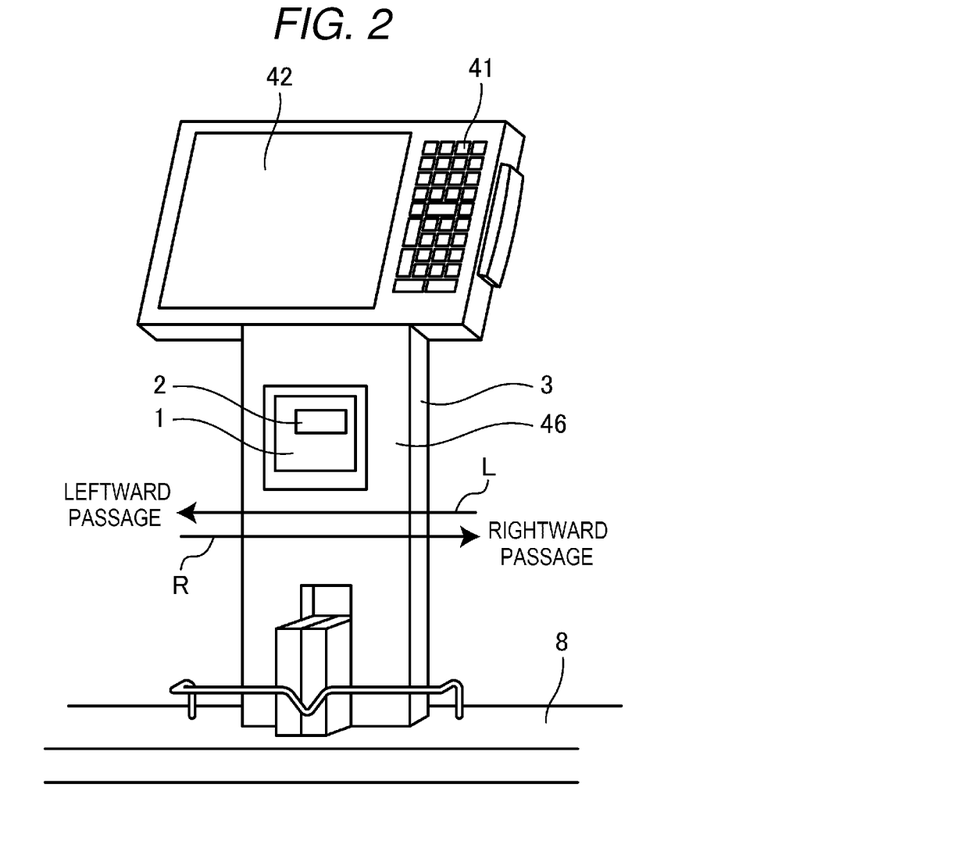
FIG. 2 is a perspective view showing the merchandise registration device including the code reading device.

The structure of the merchandise registration device 3 will now be described. FIG. 2 is a perspective view showing the merchandise registration device 3. As shown in FIG. 2, the merchandise registration device 3 has a stand unit 46 standing upward from the top surface of a checkout counter table 8, and an operation unit 41 and a display unit for store staff 42 provided on top of the stand unit 46. The other components of the merchandise registration device 3 will be described later with reference to FIG. 10.

The operation unit 41 has, for example, numeric keys for inputting the number of merchandise items, a transmission key for ending merchandise registration processing and transmitting merchandise information to the POS terminal 9, and the like. The display unit for store staff 42 displays, for example, the merchandise information about merchandise for which merchandise registration processing was performed, to the store staff operating the merchandise registration device 3.

The code reading device 1 is embedded in the stand unit 46 at a height position between the checkout counter table 8 and the display unit for store staff 42. The code reading device 1 has a vertical read window 2 facing the store staff and picks up an image of a symbol attached to merchandise passing in front of the read window 2, by the camera 19. In FIG. 2, if the code reading device 1 is set for the rightward passage, the customer moves from left to right along an arrow R. In this case, the merchandise purchased by the customer moves in the direction of the arrow R (from left to right in FIG. 2) in front of the read window 2. In this case, the left side of the code reading device 1, rather than the right side, is upstream in the direction of flow of merchandise. Meanwhile, if the code reading device 1 is set for the leftward passage, the customer moves from right to left along an arrow L. In this case, the merchandise purchased by the customer moves in the direction of the arrow L (from right to left in FIG. 2) in front of the read window 2. In this case, the right side of the code reading device 1, rather than the left side, is upstream in the direction of flow of merchandise.

Figure 3:
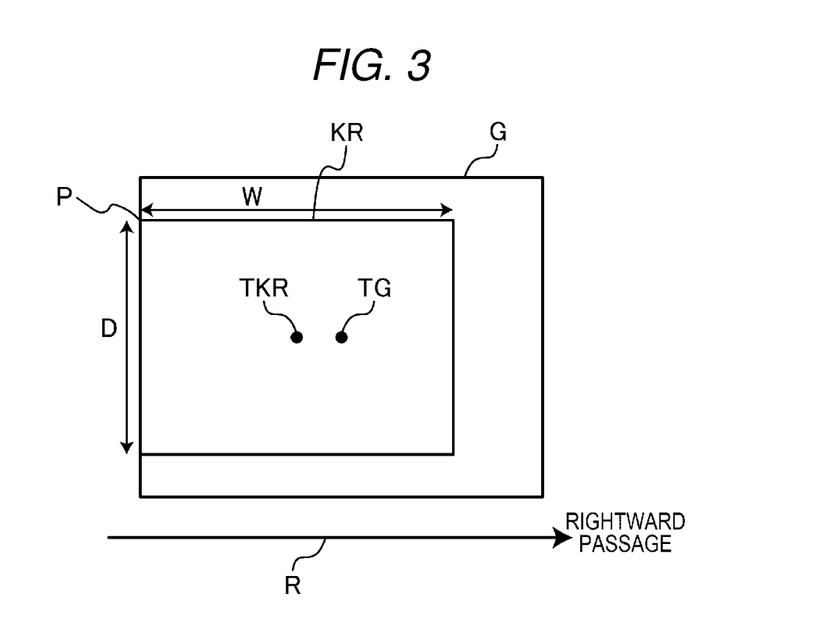
FIG. 3 is an explanatory view showing an image sensor and a clipped area and position in a rightward passage.
Figure 4:
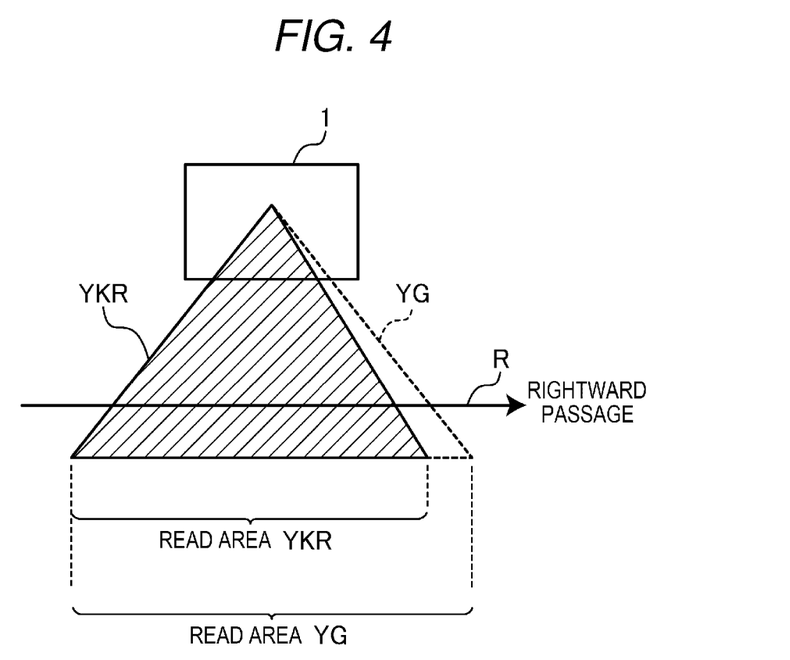
FIG. 4 is an explanatory view showing the position of a clipped read area in the rightward passage.
Figure 7:
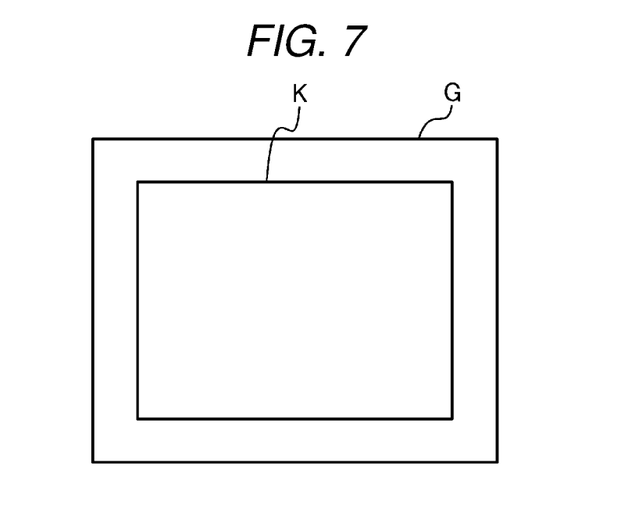
FIG. 7 is a reference explanatory view showing an image sensor and a clipped area and position in a related-art example.
Figure 8:
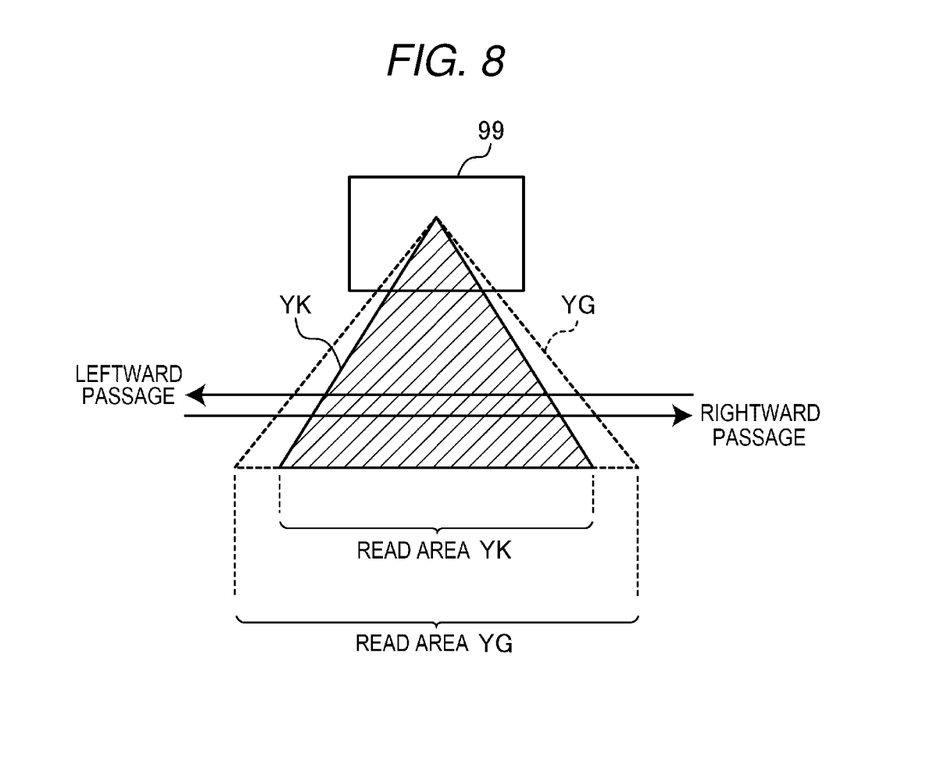
FIG. 8 is a reference explanatory view showing a clipped read area in the related-art example.

In the case of the rightward passage, merchandise moves from the left side of the code reading device 1 to the right side. Therefore, in order to increase the efficiency of scanning by the code reading device 1, it is desirable that the area and position of a clipped area where a symbol can be read are provided upstream (on the left side in FIG. 2) in the direction of flow of merchandise, in the code reading device 1. This relationship will now be described with reference to FIGS. 3 and 4. FIG. 3 is an explanatory view showing the image sensor in the code reading device 1 and the clipped area and position in the rightward passage. FIG. 4 is an explanatory view showing the position of the clipped read area by the image sensor in the rightward passage. Also, a read area by a related-art code reading device 99 is shown as a comparative example. FIG. 7 is a reference explanatory view showing the image sensor and the clipped area and position in the code reading device 99 in the related-art example. FIG. 8 is a reference explanatory view showing the position of the clipped read area by the image sensor in the related-art example.

In the comparative example, G is the area available for image pickup by the image sensor 191 provided in the camera 19. K represents the clipped area and position having a smaller area than the area available for image pickup G. Clipping refers to cutting out a region having a smaller area than the area available for image pickup G, in the area available for image pickup G. The code reading device 99 picks up an image, using image pickup elements located in the clipped area K (hereinafter referred to as clipping K) in the area available for image pickup G. The code reading device 99 then performs image processing on the image picked up in the area and position of the clipping K.

In the case of the comparative example, the area and position of the clipping K are fixed. Therefore, the code reading device 99 can read a symbol attached to merchandise, at the clipping K. In FIG. 8, if a read area is not clipped (if the area available for image pickup G is employed as the read area), the code reading device 99 can read a symbol in the range of a read area YG. However, if a read area is clipped (if the clipping K is employed as the read area), the code reading device 99 can read a symbol in the range of a read area YK. In this case, the read area YK is narrower than the read area YG at both sides. In this case, in both when the flow of merchandise is the rightward passage and when the flow of merchandise is the leftward passage, the merchandise enters the read area later (the reading of the merchandise starts later) than when the clipping is not done. Therefore, the efficiency of scanning by the code reading device 99 is low.

In contrast, in the case of the embodiment (where merchandise moves in the rightward passage), as shown in FIG. 3, the position of clipping is changed to (moved) upstream in the direction of flow of merchandise (to the left in FIG. 3). In FIG. 3, G is the area available for image pickup by the image sensor 191 provided in the camera 19. KR represents the clipped area and position having a smaller area than the area available for image pickup G. The area of the clipping KR is decided by inputting the number of pixels in the horizontal direction of the clipping KR (the direction of an arrow W) (change information or area information) and the number of pixels in the vertical direction (the direction of an arrow D) (change information or area information). Making the number of pixels in the horizontal direction and the number of pixels in the vertical direction variable enables change in the area of the clipping KR. The number of pixels in the horizontal direction and the number of pixels in the vertical direction are equivalent to number-of-pixels information.

The position of the clipping KR is decided by inputting the coordinates of the position of the starting point of the clipping KR (change information or position information). The position of the starting point of the clipping KR has, for example, the coordinates of the position of a top left corner P of the clipping KR.

The number of pixels for deciding the area of the clipping KR and the coordinates for deciding the position of the clipping KR can be set and inputted by operating an operation unit 17 of the code reading device 1, described later. Alternatively, the number of pixels and the coordinates can be set and inputted by operating the operation unit 41 of the merchandise registration device 3. In the embodiment, the number of pixels and the coordinates are inputted by operating the operation unit 41 of the merchandise registration device 3.

The area and position of the clipping KR can also be decided by inputting the coordinates of the four corners of the clipping KR (change information or position information). The area and position of the clipping KR may also be decided by other known methods.

In the case of FIG. 3, merchandise moves in the rightward passage. Therefore, the position of the clipping KR is changed (moved) to the leftmost side (upstream in the direction of flow of merchandise) in relation to the area available for image pickup G. This aims to cause the merchandise to enter the area of the clipping KR at the same time or almost at the same time as moving from the left and entering the area available for image pickup G.

To describe this in more detail, as the position of the clipping KR is changed (moved) to the leftmost side (upstream in the direction of flow of merchandise) in relation to the area available for image pickup G, the merchandise entering the read area YG of the area available for image pickup G simultaneously enters a read area YKR of the clipping KR, as shown in FIG. 4. Therefore, the reading of the merchandise moving in the rightward passage can be started early.

Thus, in the code reading device 1 according to the embodiment, the efficiency of scanning in the clipped state can be increased. In the embodiment, the position of the clipping KR is changed (moved) to the leftmost side (upstream in the direction of flow of merchandise) in relation to the area available for image pickup G. However, the position of the clipping KR may be changed to more upstream in the direction of flow of merchandise than the position of the clipping K shown in FIG. 7 (more to the left than in FIG. 7). That is, the clipping KR may be located in such a way that a center position TKR of the clipping KR is shifted more upstream in the direction of flow of merchandise (more to the left in FIG. 3) than a center position TG of the area available for image pickup G. The area of the clipping KR may also be changed according to the processing capability of a CPU installed in the code reading device 1.

In the embodiment, the position of the clipping KR is changed to (moved) upstream in the direction of flow of merchandise in relation to the area available for image pickup G. However, if merchandise whose symbol was read is placed near directly below the code reading device 1, the position of the clipping KR may be changed to (moved) further upward in order to prevent re-reading of the symbol on the merchandise that was already read.

Figure 5:
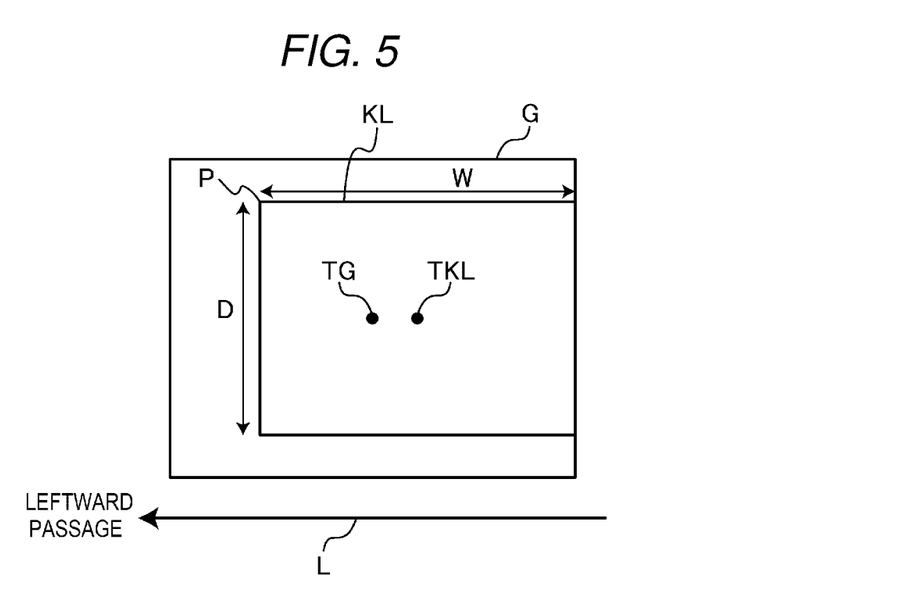
FIG. 5 is an explanatory view showing an image sensor and a clipped area and a position in a leftward passage.

The embodiment when merchandise moves in the leftward passage will now be described. When merchandise moves in the leftward passage, as shown in FIG. 5, the position of clipping is changed to (moved) upstream in the direction of flow of merchandise (to the right in FIG. 5). In FIG. 5, G is the area available for image pickup by the image sensor 191 provided in the camera 19. KL represents the clipped area and position having a smaller area than the area available for image pickup G. The area of the clipping KL is decided by inputting the number of pixels in the horizontal direction of the clipping KL (the direction of an arrow W) (change information or area information) and the number of pixels in the vertical direction (the direction of an arrow D) (change information or area information). Making the number of pixels in the horizontal direction and the number of pixels in the vertical direction variable enables change in the area of the clipping KL. The number of pixels in the horizontal direction and the number of pixels in the vertical direction are equivalent to number-of-pixels information.

The position of the clipping KL is decided by inputting the coordinates of the position of the starting point of the clipping KL (change information or position information). The position of the starting point of the clipping KL has, for example, the coordinates of the position of a top left corner P of the clipping KL.

The number of pixels for deciding the area of the clipping KL and the coordinates for deciding the position of the clipping KL can be set and inputted by operating the operation unit 17 of the code reading device 1, described later. Alternatively, the number of pixels and the coordinates can be set and inputted by operating the operation unit 41 of the merchandise registration device 3. In the embodiment, the number of pixels and the coordinates are inputted by operating the operation unit 41 of the merchandise registration device 3.

The area and position of the clipping KL can also be decided by inputting the coordinates of the four corners of the clipping KL (change information or position information). The area and position of the clipping KL may also be decided by other known methods.

In the case of FIG. 5, merchandise moves in the leftward passage. Therefore, the position of the clipping KL is changed (moved) to the rightmost side (upstream in the direction of flow of merchandise) in relation to the area available for image pickup G. This aims to cause the merchandise to enter the area of the clipping KL at the same time or almost at the same time as moving from the right and entering the area available for image pickup G.

Figure 6:
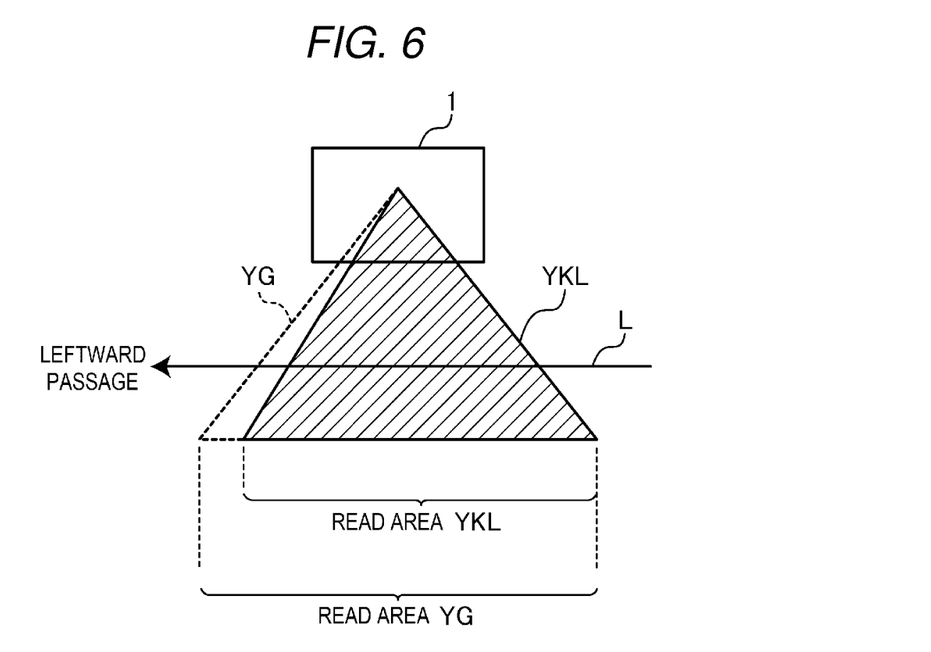
FIG. 6 is an explanatory view showing the position of a clipped read area in the leftward passage.

To describe this in more detail, as the position of the clipping KL is changed (moved) to the rightmost side (upstream in the direction of flow of merchandise) in relation to the area available for image pickup G, the merchandise entering the read area YG of the area available for image pickup G simultaneously enters a read area YKL of the clipping KL, as shown in FIG. 6. Therefore, the reading of the merchandise moving in the leftward passage can be started early.

Thus, in the code reading device 1 according to the embodiment, the efficiency of scanning in the clipped state can be increased. In the embodiment, the position of the clipping KL is changed (moved) to the rightmost side (upstream in the direction of flow of merchandise) in relation to the area available for image pickup G. However, the position of the clipping KL may be changed to more upstream in the direction of flow of merchandise than the position of the clipping K shown in FIG. 7 (more to the right than in FIG. 7). That is, the clipping KL may be located in such a way that a center position TKL of the clipping KL is shifted more upstream in the direction of flow of merchandise (more to the right in FIG. 5) than a center position TG of the area available for image pickup G. The area of the clipping KL may also be changed according to the processing capability of the CPU installed in the code reading device 1.

In the embodiment, the position of the clipping KL is changed to (moved) upstream in the direction of flow of merchandise in relation to the area available for image pickup G. However, if merchandise whose symbol was read is placed near directly below the code reading device 1, the position of the clipping KL may be changed to (moved) further upward in order to prevent re-reading of the symbol on the merchandise that was already read.

Figure 9:
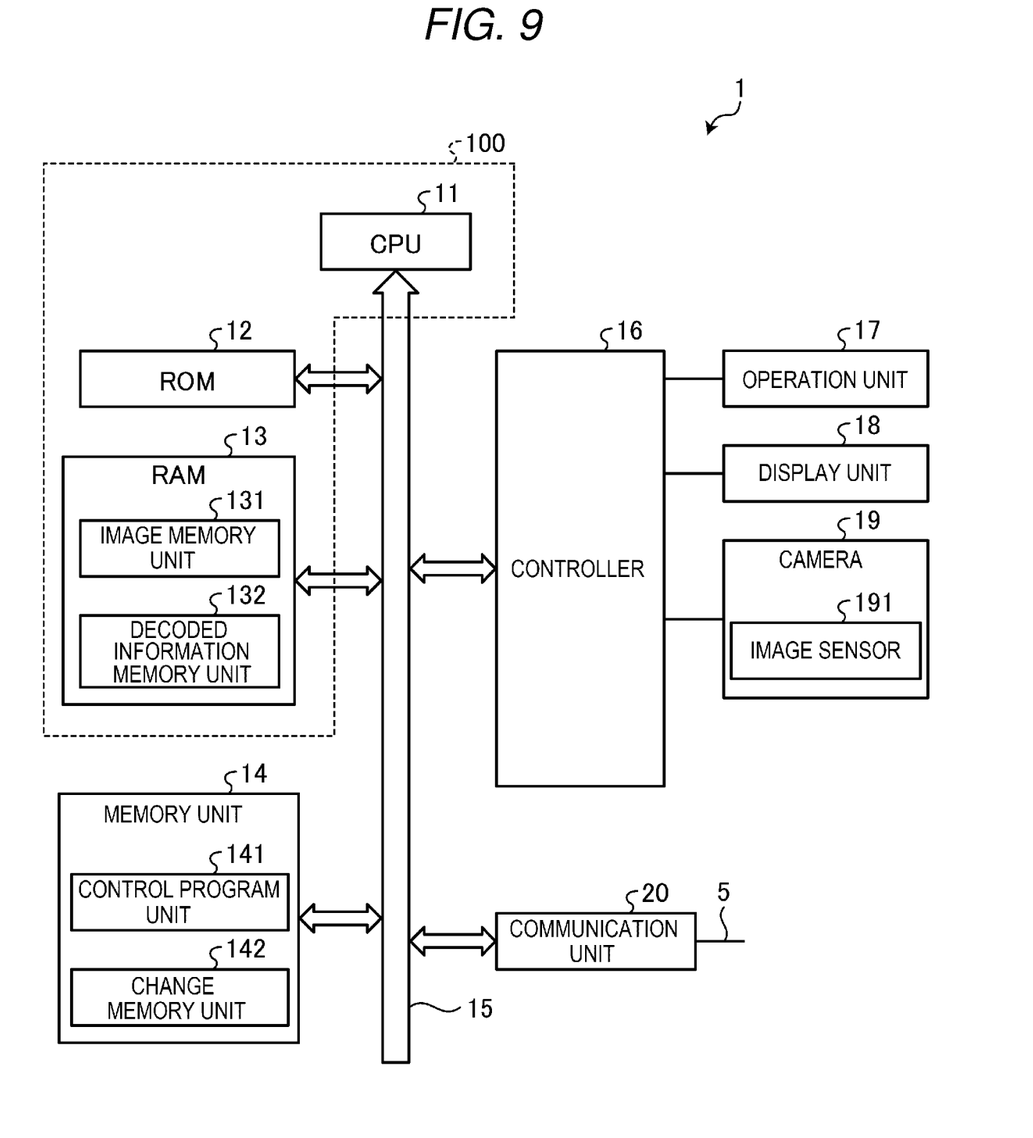
FIG. 9 is a block diagram showing an example of the hardware configuration of the code reading device.

The hardware of the code reading device 1 will now be described. FIG. 9 is a block diagram showing an example of the hardware configuration of the code reading device 1. As shown in FIG. 9, the code reading device 1 has a CPU (central processing unit) 11, which is an example of a processor, a ROM (read-only memory) 12, a RAM (random-access memory) 13, and a memory unit 14 or the like. The CPU 11 is a main controller. The ROM 12 stores various programs. In the RAM 13, programs and various data are loaded. The memory unit 14 stores various programs. The CPU 11, the ROM 12, the RAM 13, and the memory unit 14 are connected to each other via a bus 15. The CPU 11, the ROM 12, and the RAM 13 together form a control unit 100. That is, the control unit 100 executes control processing for the code reading device 1, described later, by having the CPU 11 operate according to a control program stored in the ROM 12 or the memory unit 14 and loaded in the RAM 13.

The RAM 13 has an image memory unit 131 and a decoded information memory unit 132. The image memory unit 131 stores an image of merchandise picked up by the camera 19. The decoded information memory unit 132 stores code information formed by image processing (decoding) based on the image stored in the image memory unit 131.

The memory unit 14 is formed by a non-volatile memory such as an HDD (hard disk drive) or a flash memory, which holds the information stored therein even if the power is turned off. The memory unit 14 has a control program unit 141 storing a control program for controlling the code reading device 1, and a change memory unit 142. The change memory unit 142 stores change information (area information and position information) inputted from the merchandise registration device 3.

The control unit 100 is connected to the operation unit 17, a display unit 18, and the camera 19 via the bus 15 and a controller 16. The camera 19 has the image sensor 191, where a large number of image pickup elements are arranged in a planar form.

The operation unit 17 is a keyboard or a touch panel, for example, and is operated by the operator of the code reading device 1. The display unit 18 is a liquid crystal display device, for example, and displays information to the operator of the code reading device 1.

The control unit 100 is also connected to a communication unit 20 via the bus 15. The communication unit 20 is connected to the merchandise registration device 3 via the connection line 5 and transmits and receives information to and from the merchandise registration device 3.

Figure 10:
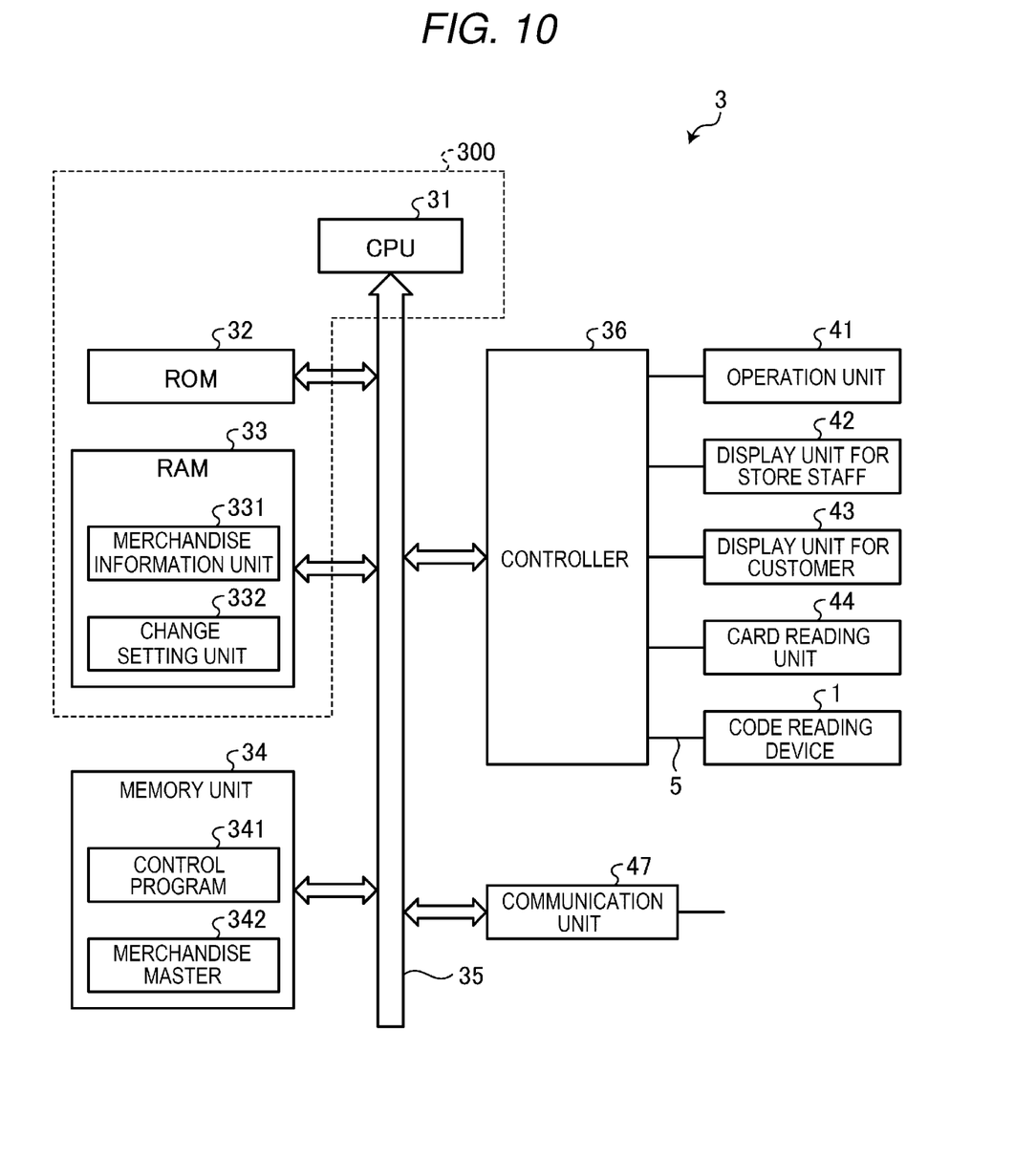
FIG. 10 is a block diagram showing an example of the hardware configuration of the merchandise registration device.

The hardware of the merchandise registration device 3 will now be described. FIG. 10 is a block diagram showing an example of the hardware configuration of the merchandise registration device 3. As shown in FIG. 10, the merchandise registration device 3 has a CPU 31, which is an example of a processor, a ROM 32, a RAM 33, and a memory unit 34 or the like. The CPU 31 is a main controller. The ROM 32 stores various programs. In the RAM 33, programs and various data are loaded. The memory unit 34 stores various programs. The CPU 31, the ROM 32, the RAM 33, and the memory unit 34 are connected to each other via a bus 35. The CPU 31, the ROM 32, and the RAM 33 together form a control unit 300. That is, the control unit 300 executes control processing for the merchandise registration device 3, described later, by having the CPU 31 operate according to a control program stored in the ROM 32 or the memory unit 34 and loaded in the RAM 33.

The RAM 33 has the merchandise information unit 331 and a change setting unit 332. The merchandise information unit 331 stores merchandise information (such as merchandise code, merchandise name, and price of merchandise) about merchandise for which merchandise registration processing was performed. The change setting unit 332 stores area information representing the area of inputted clipping and position information representing the position of the clipping.

The memory unit 34 is formed by a non-volatile memory such as an HDD or a flash memory, which holds the information stored therein even if the power is turned off. The memory unit 34 has a control program unit 341 storing a control program for controlling the merchandise registration device 3, and a merchandise master 342. The merchandise master 342 stores merchandise information (such as merchandise name and price of merchandise) about merchandise sold at the store, in correlation with a merchandise code that specifies the merchandise.

The control unit 300 is connected to the operation unit 41, the display unit for store staff 42, a display unit for customer 43, a card reading unit 44, and the code reading device 1 via the bus 35 and a controller 36.

The operation unit 41 is a keyboard or a touch panel, for example, and is operated by the operator of the merchandise registration device 3. The display unit for store staff 42 is a liquid crystal display device, for example, and displays information to a staff member who is the operator of the merchandise registration device 3. The display unit for customer 43 is a liquid crystal display device, for example, and display information to the customer. The card reading unit 44 reads a member code that specifies a member from a card (for example, a member card showing that the customer is the member, or the like) used for settlement. The code reading device 1 is connected to the controller 36 via the connection line 5.

The control unit 300 is also connected to a communication unit 47 via the bus 35. The communication unit 47 is connected to the POS terminal 9 via the communication line 7 and transmits and receives information to and from the POS terminal 9.

Figure 11:
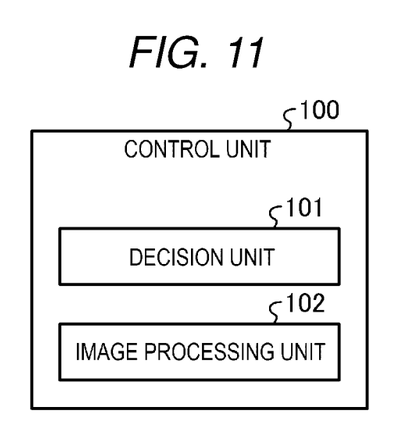
FIG. 11 is a functional block diagram showing an example of the functional configuration of the code reading device.

The functional configuration of the code reading device 1 will now be described. FIG. 11 is a functional block diagram showing an example of the functional configuration of the code reading device 1. The control unit 100 of the code reading device 1 operates according to the control program stored in the ROM 12 or the control program unit 141 of the memory unit 14 and thus functions as a decision unit 101 and an image processing unit 102.

When area information and position information for changing a set area and position of clipping a part of the image sensor 191 are inputted, the decision unit 101 decides an area and position of clipping in the image sensor 191, based on the area information and the position information. Specifically, when number-of-pixels information, which is the area information, and coordinate information, which is the position information, set by the operation unit 41 of the merchandise registration device 3 are inputted, the decision unit 101 decides an area and position of clipping in the image sensor 191, based on the number-of-pixels information and the coordinate information.

The decision unit 101 decides the position of clipping in such a way that the center point (TKR or TKL) of the area of clipping is located upstream in the direction of movement of merchandise from the center position TG of the image sensor 191.

The image processing unit 102 performs image processing on a symbol that is picked up as an image, based on an image from the image sensor 191 corresponding to the decided position of clipping.

Figure 12:
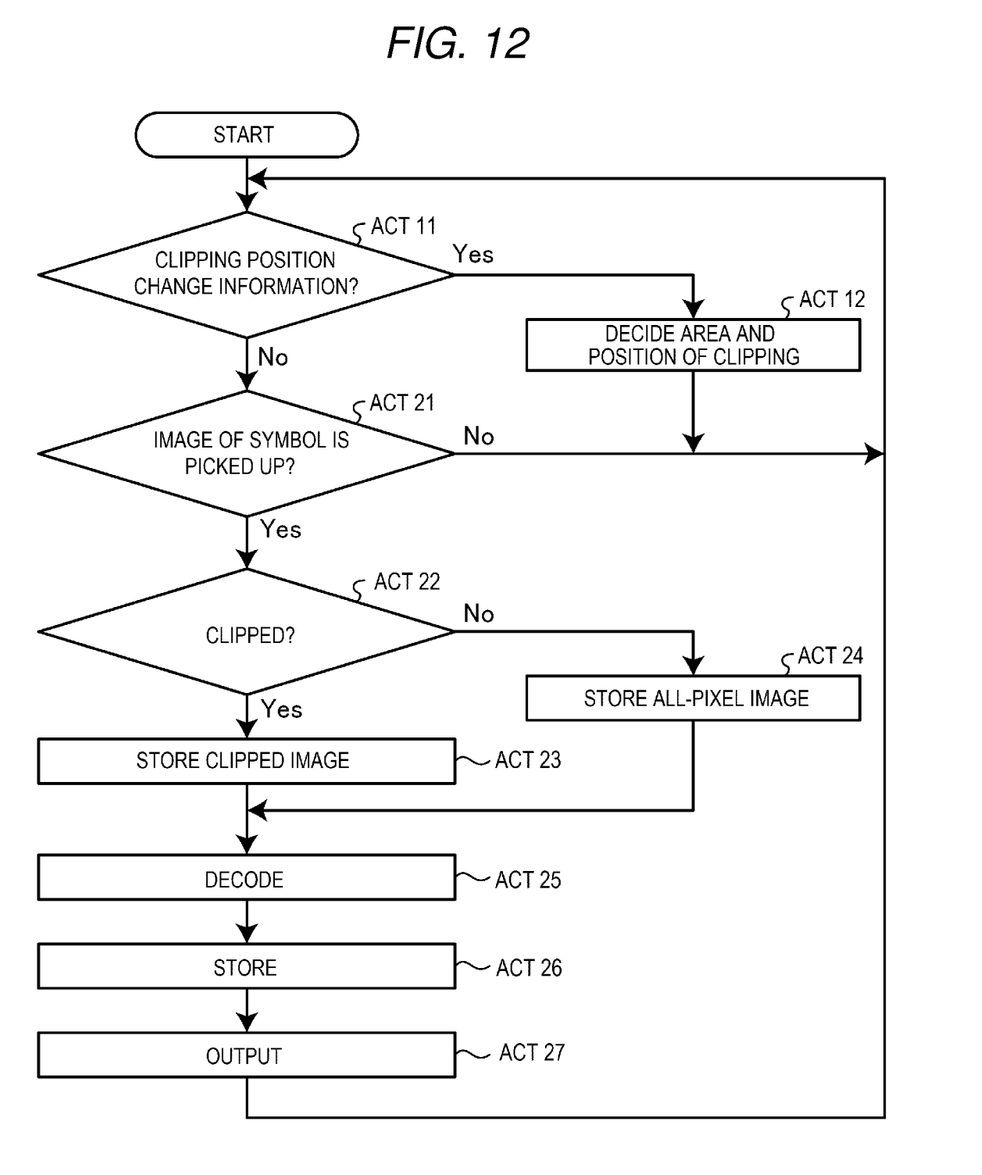
FIG. 12 is a flowchart showing an example of control processing for the code reading device.

The control of the code reading device 1 will now be described. FIG. 12 is a flowchart showing an example of control processing for the code reading device 1. The control unit 100 of the code reading device 1 determines whether change information for changing the area and position of clipping (area information for changing the area of clipping (number-of-pixels information) and position information (coordinate information of the corner P, that is, the starting point)) is inputted from the merchandise registration device 3 or not (ACT 11). If the control unit 100 determines that the change information is inputted (Yes in ACT 11), the decision unit 101 stores the inputted change information in the change memory unit 142 and thus decides an area and position of clipping in the image sensor 191 (ACT 12). The control unit 100 then returns to ACT 11.

If the control unit 100 determines that the change information is not inputted (No in ACT 11), the control unit 100 determines whether an image of a symbol is picked up by the camera 19 or not (ACT 21). If information about a pattern of an image showing a symbol is registered in advance and an image showing the registered pattern of the symbol is included the image picked up by the camera 19, the control unit 100 determines that the image of the symbol is picked up.

If the control unit 100 determines that the image of the symbol is picked up (Yes in ACT 21), the control unit 100 determines whether the image sensor 191 is clipped or not (ACT 22). For example, if change information about clipping is stored in the change memory unit 142, the control unit 100 determines that the image sensor 191 is clipped. Also, for example, if an instruction to clip (for example, an operation on a button or an instruction from the merchandise registration device 3) is given, the control unit 100 determines that the image sensor 191 is clipped. If the control unit 100 determines that the image sensor 191 is clipped (Yes in ACT 22), the control unit 100 causes the image sensor 191 at the clipped position and in the clipped area (clipping KR in FIG. 3, clipping KL in FIG. 5) to receive the picked-up image (ACT 23). Meanwhile, if the control unit 100 determines that the image sensor 191 is not clipped (No in ACT 22), the control unit 100 causes the entirety of the image sensor 191 (area available for image pickup G) to receive the picked-up image (ACT 24).

Next, the image processing unit 102 performs image processing on (decodes) the image received by the image sensor 191 (ACT 25). The control unit 100 then stores the image-processed code information in the decoded information memory unit 132 (ACT 26). The control unit 100 then outputs the code information stored in the decoded information memory unit 132 to the merchandise registration device 3 (ACT 27). The control unit 100 then returns to ACT 11. Also, if the control unit 100 determines that the image of the symbol is not picked up (No in ACT 21), the control unit 100 returns to ACT 11.

In such a code reading device 1 according to the embodiment, the area and position of clipping can be changed, based on the inputted change information. Inputting the change information enables the area and position of clipping to be changed to (moved) upstream in the direction of flow of merchandise in advance. Therefore, the efficiency of scanning in the reading of a symbol by the code reading device 1 can be increased.

Figure 13:
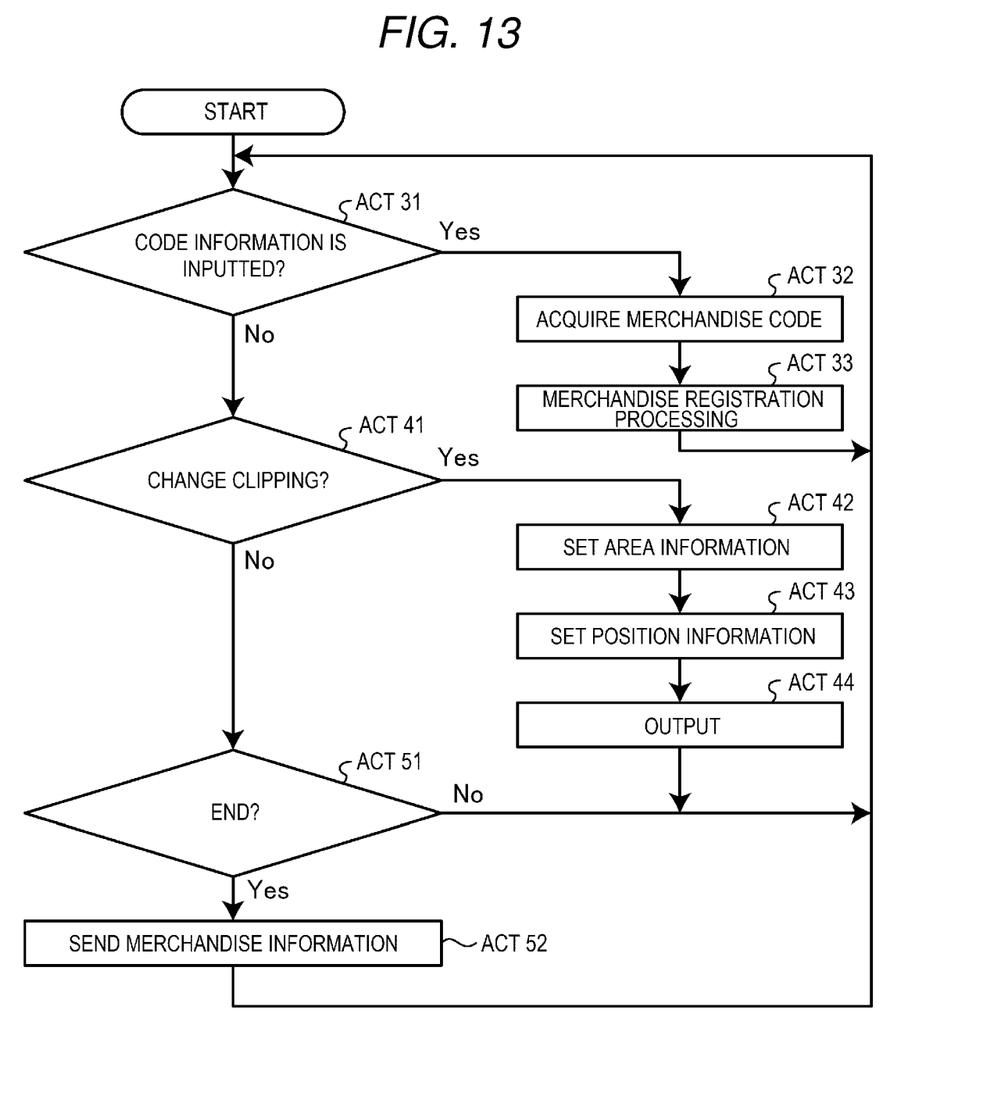
FIG. 13 is a flowchart showing an example of control processing for the merchandise registration device.

The control of the merchandise registration device 3 will now be described. FIG. 13 is a flowchart showing an example of control processing for the merchandise registration device 3. As shown in FIG. 13, the control unit 300 of the merchandise registration device 3 determines whether code information is inputted from the code reading device 1 or not (ACT 31). If the control unit 300 determines that the code information is inputted (Yes in ACT 31), the control unit 300 acquires the merchandise code of the merchandise based on the inputted code information (ACT 32). The control unit 300 then executes merchandise registration processing of searching the merchandise master 342, based on the acquired merchandise code, acquiring the merchandise information about the merchandise, and storing the merchandise information in the merchandise information unit 331 (ACT 33). The control unit 300 then returns to ACT 31.

If the control unit 300 determines that the code information is not inputted (No in ACT 31), the control unit 300 determines whether an instruction to change the area and position of clipping is given or not (ACT 41). The instruction to change the area and position of clipping is given, for example, by turning the merchandise registration device 3 into a setting mode and operating the operation unit 41. If the control unit 300 determines that the instruction to change the area and position of clipping is given (Yes in ACT 41), the control unit 300 sets area information representing the area of clipping inputted by operating the operation unit 41, in the change setting unit 332 (ACT 42). Next, the control unit 300 sets position information representing the position of clipping inputted by operating the operation unit 41, in the change setting unit 332 (ACT 43). The control unit 300 then outputs the area information and the position information set in the change setting unit 332 to the code reading device 1 (ACT 44). The control unit 300 then returns to ACT 31.

If the control unit 300 determines that the instruction to change the area and position of clipping is not given (No in ACT 41), the control unit 300 determines whether an operation indicating an end to the merchandise registration processing is carried out or not (ACT 51). For example, if an end button (not illustrated) provided at the operation unit 41 is operated, the control unit 300 determines that the operation indicating an end to the merchandise registration processing is carried out. If the control unit 300 determines that the operation indicating an end to the merchandise registration processing is carried out (Yes in ACT 51), the control unit 300 transmits the merchandise information stored in the merchandise information unit 331 to the POS terminal 9 (ACT 52). The control unit 300 then returns to ACT 31. Also, if the control unit 300 determines that the operation indicating an end to the merchandise registration processing is not carried out (No in ACT 51), the control unit 300 returns to ACT 31.

As described above, the code reading device 1 according to the embodiment includes: the camera 19 including the image sensor 191 with a plurality of image pickup elements, the camera 19 being configured to pick up an image of a symbol attached to merchandise; the decision unit 101 configured to decide an area and position of clipping in the image sensor 191, based on change information for changing an area and position of clipping a part of the image sensor 191 set by the merchandise registration device 3, when the change information is inputted; and the image processing unit 102 configured to perform image processing on the symbol, based on an image by the image sensor 191 corresponding to the decided area and position of clipping.

In the code reading device 1 according to the embodiment having such a configuration, the area and position of clipping can be changed, based on the change information set by the merchandise registration device 3. Therefore, the area and position of clipping can be changed to upstream in the direction of flow of merchandise, whether the merchandise registration device 3 operates for the rightward passage or the leftward passage. Thus, the efficiency of scanning by the code reading device 1 in the clipped state can be increased.

While an embodiment of the present disclosure has been described, this embodiment is presented simply as an example and is not intended to limit the scope of the present disclosure. This novel embodiment can be carried out in various other forms. Various omissions, replacements, and modifications can be made without departing from the spirit and scope of the present disclosure. The embodiment and the modifications thereof are included in the spirit and scope of the present disclosure and also included in the scope of the claims and equivalents thereof.

In the embodiment, the image sensor 191 in the clipped area and position receives the picked-up image and image processing is performed for the image pickup elements of the image sensor 191 that receive the image. However, this is not limiting. For example, the entirety of the image sensor 191 may receive the picked-up image and image processing may be executed for the image pickup elements of the image sensor 191 in the clipped area and position.

In the embodiment, the area information and the position information are set by operating the operation unit 41 of the merchandise registration device 3. However, this is not limiting. For example, the change information (area information and position information) may be set by operating the operation unit 17 of the code reading device 1.

In the embodiment, the area information and the position information are set as the change information for deciding the area and position of clipping. However, this is not limiting. For example, the area of clipping may be fixed and only the position information for deciding (changing) the position of clipping may be set as the change information.

The program executed by the code reading device 1 according to the embodiment is recorded as a file in an installable format or an executable format in a computer-readable recording medium such as a CD-ROM, flexible disk (FD), CD-R, or DVD (digital versatile disk), and provided in this form.

The program executed by the code reading device 1 according to the embodiment may be stored on a computer connected to a network such as the internet and may be downloaded via the network and thus provided. The program executed by the code reading device 1 according to the embodiment may also be provided or distributed via a network such as the internet.

The program executed by the code reading device 1 according to the embodiment may also be stored in the ROM or the like in advance and thus provided.

What is claimed is:

1. A code reading device, comprising:
   a camera comprising an image sensor with a plurality of image pickup elements, the camera configured to pick up an image of a symbol attached to merchandise;
   a decision component configured to decide a position of clipping in the image sensor, based on change information for changing a set position of clipping in the image sensor, when the change information is input; and
   an image processor configured to perform image processing on the symbol, based on an image by the image sensor corresponding to the decided position of clipping,
   a center position of the clipping is placed in a bias position from a center position of the image sensor,
   the decision component decides the position of the clipping so that the center position of the clipping is located more upstream in a direction of movement of the merchandise than the center position of the image sensor.

2. The code reading device according to claim 1, wherein the camera picks up the image of the symbol, using the image sensor at the position of the clipping.

3. The code reading device according to claim 1, wherein the image processor performs image processing on the image by the image sensor at the position of the clipping, of the image picked up by the camera.

4. The code reading device according to claim 1, wherein the change information comprises position information representing a position of clipping and area information representing an area of clipping, the position information comprising coordinate information representing a position of a starting point of the area of clipping, the area information comprising number-of-pixels information representing a number of pixels in a vertical direction and in a horizontal direction in the image sensor that is clipped.

5. The code reading device according to claim 1, wherein the decision component is configured to cut out a region having a smaller area than an area available for image pickup.

6. The code reading device according to claim 1, wherein the symbol is a barcode.

7. A code reading method for a code reading device comprising a camera comprising an image sensor with a plurality of image pickup elements, the camera configured to pick up an image of a symbol attached to merchandise, the code reading method comprising:
   deciding a position of clipping in the image sensor, based on change information for changing a set position of clipping in the image sensor, when the change information is input;
   performing image processing on the symbol, based on an image by the image sensor corresponding to the decided position of clipping;
   placing a center position of the clipping in a bias position from a center position of the image sensor; and
   deciding the position of the clipping so that the center position of the clipping is located more upstream in a direction of movement of the merchandise than the center position of the image sensor.

8. The code reading method according to claim 7, further comprising:

picking up the image of the symbol using the image sensor at the position of the clipping.

9. The code reading method according to claim 7, further comprising:

performing image processing on the image by the image sensor at the position of the clipping, of the image picked up by the camera.

10. The code reading method according to claim 7, wherein the change information comprises position information representing a position of clipping and area information representing an area of clipping, the position information comprising coordinate information representing a position of a starting point of the area of clipping, the area information comprising number-of-pixels information representing a number of pixels in a vertical direction and in a horizontal direction in the image sensor that is clipped.

11. A merchandise sales data processing device, comprising:

a merchandise registration device; and
a code reading device, comprising:
a camera comprising an image sensor with a plurality of image pickup elements, the camera configured to pick up an image of a symbol attached to merchandise;
a decision component configured to decide a position of clipping in the image sensor, based on change information for changing a set position of clipping in the image sensor, when the change information is input; and
an image processor configured to perform image processing on the symbol, based on an image by the image sensor corresponding to the decided position of clipping, a center position of the clipping is placed in a bias position from a center position of the image sensor, the decision component decides the position of the clipping so that the center position of the clipping is located more upstream in a direction of movement of the merchandise than the center position of the image sensor.

12. The merchandise sales data processing device according to claim 11, wherein the camera picks up the image of the symbol, using the image sensor at the position of the clipping.

13. The merchandise sales data processing device according to claim 11, wherein the image processor performs image processing on the image by the image sensor at the position of the clipping, of the image picked up by the camera.

14. The merchandise sales data processing device according to claim 11, wherein the change information comprises position information representing a position of clipping and area information representing an area of clipping, the position information comprising coordinate information representing a position of a starting point of the area of clipping, the area information comprising number-of-pixels information representing a number of pixels in a vertical direction and in a horizontal direction in the image sensor that is clipped.

15. The merchandise sales data processing device according to claim 11, wherein the decision component is configured to cut out a region having a smaller area than an area available for image pickup.

16. The merchandise sales data processing device according to claim 11, wherein the symbol is a barcode.

17. The merchandise sales data processing device according to claim 11, wherein the merchandise sales data processing device is a POS terminal.

* * * * *